United States Patent
Schmid

(10) Patent No.: US 9,669,577 B2
(45) Date of Patent: Jun. 6, 2017

(54) STRETCH BLOW MOLDING SYSTEM

(71) Applicant: NORGREN AG, Balterswil (CH)

(72) Inventor: Daniel Schmid, Balterswil (CH)

(73) Assignee: Norgren AG, Balterswil (CH)

( * ) Notice: Subject to any disclaimer, the term of this patent is extended or adjusted under 35 U.S.C. 154(b) by 309 days.

(21) Appl. No.: 14/391,194

(22) PCT Filed: Apr. 26, 2013

(86) PCT No.: PCT/EP2013/058704
§ 371 (c)(1),
(2) Date: Oct. 8, 2014

(87) PCT Pub. No.: WO2013/160436
PCT Pub. Date: Oct. 31, 2013

(65) Prior Publication Data
US 2015/0042021 A1   Feb. 12, 2015

Related U.S. Application Data

(60) Provisional application No. 61/638,604, filed on Apr. 26, 2012.

(51) Int. Cl.
*B29C 49/42* (2006.01)
*B29C 49/12* (2006.01)
*B29C 49/58* (2006.01)
*B29C 49/78* (2006.01)
*B29C 49/16* (2006.01)
*B29C 49/06* (2006.01)
(Continued)

(52) U.S. Cl.
CPC .......... *B29C 49/4289* (2013.01); *B29C 49/12* (2013.01); *B29C 49/16* (2013.01); *B29C 49/42* (2013.01); *B29C 49/58* (2013.01); *B29C 49/78* (2013.01); *B29C 49/783* (2013.01); *B29C 49/06* (2013.01); *B29C 2049/1257* (2013.01); *B29C 2049/1261* (2013.01); *B29C 2049/5827* (2013.01); *B29K 2105/258* (2013.01); *B29K 2267/003* (2013.01); *B29L 2031/7158* (2013.01)

(58) Field of Classification Search
None
See application file for complete search history.

(56) References Cited

U.S. PATENT DOCUMENTS

2008/0128958 A1\* 6/2008 Litzenberg ............ B29C 49/783
264/523

FOREIGN PATENT DOCUMENTS

DE  102006061301 A1  6/2008
DE  202009006684 U1  8/2009
(Continued)

*Primary Examiner* — Monica Huson
(74) *Attorney, Agent, or Firm* — The Ollila Law Group LLC

(57) ABSTRACT

A stretch blow molding system (200) is provided. The stretch blow molding system comprises a cylinder (201) including a movable stretch rod (202) and a blow-mold valve (204). The blow-mold valve (204) comprises a first fluid port (204a) in fluid communication with a first pressurized fluid source (364a). The blow-mold valve (204) also includes a second fluid port (204b) in fluid communication with a second pressurized fluid source (364b). A third fluid port (204c) of the blow-mold valve is in fluid communication with the cylinder (201) and selectively in fluid communication with the first fluid port (204a) and the second fluid port (204b).

13 Claims, 6 Drawing Sheets

(51) Int. Cl.
  *B29K 105/00*  (2006.01)
  *B29K 267/00*  (2006.01)
  *B29L 31/00*  (2006.01)

(56) References Cited

FOREIGN PATENT DOCUMENTS

| | | | |
|---|---|---|---|
| EP | 1789248 | A1 | 5/2007 |
| EP | 1905569 | A2 | 4/2008 |
| WO | 9508430 | A1 | 3/1995 |
| WO | 2006029584 | A1 | 3/2006 |
| WO | 2011154326 | A1 | 12/2011 |

\* cited by examiner

STRETCH BLOW MOLDING SYSTEM

This is a National Stage entry of International Application No. PCT/EP2013/058704, with an international filing date of Apr. 26, 2013, which claims priority of U.S. provisional patent application No. 61/638,604, filed Apr. 26, 2012, entitled "STRETCH BLOW MOLDING SYSTEM".

TECHNICAL FIELD

The embodiments described below relate to, blow molding, and more particularly, to a stretch blow molding system.

BACKGROUND OF THE INVENTION

Blow molding is a generally known process for molding a preform part into a desired product. The preform is in the general shape of a tube with an opening at one end for the introduction of pressurized gas, typically air; however, other gases may be used. One specific type of blow molding is stretch blow molding (SBM). In typical SBM applications, a valve block provides both low and high-pressure gas to expand the preform into a mold cavity. The mold cavity comprises the outer shape of the desired product. SBM can be used in a wide variety of applications; however, one of the most widely used applications is in the production of Polyethylene terephthalate (PET) products, such as drinking bottles. Typically, the SBM process uses a low-pressure fluid supply along with a stretch rod that is inserted into the preform to stretch the preform in a longitudinal direction and radially outward and then uses a high-pressure fluid supply to expand the preform into the mold cavity. The low-pressure fluid supply along with the stretch rod is typically referred to as a pre-blowing phase of the molding cycle. The high-pressure fluid supply that expands the preform into the mold cavity is typically referred to as the blowing phase of the molding cycle. The low-pressure and high-pressure fluid supplies can be controlled using blow-mold valves. The resulting product is generally hollow with an exterior shape conforming to the shape of the mold cavity. The gas in the preform is then exhausted through one or more exhaust valves. This process is repeated during each stretch blow molding cycle.

FIG. 1 shows a prior art stretch blow molding valve block assembly 100. The prior art stretch blow molding valve block assembly 100 includes a valve block 102, a stretch rod 104, control chambers 106a-106d, operating chamber rings 108a-108d, valve pistons 110a-110d, and pilot valves 112. The stretch rod 104 extends vertically through the central chamber 101 and out the bottom of the valve block 102. The valve block 102 includes four sets of valves that are vertically stacked in the central chamber 101 and around the stretch rod 104. For example, the four sets of valves may correspond to a pre-blowing valve, a blowing valve, an air recovery valve, and an exhaust valve. As can be appreciated, a pilot air supply is provided by the pilot valves 112 in order to control the position of each valve piston 110a-110d. As can be seen, the valve pistons 110a and 110b are shown in the open position with the valve pistons 110c and 110d in the closed position. The valve block 102 also includes a number of inlet and outlet ports 114, 116, and 118. In use, the valve pistons are controlled using the various pilot valves 112 in order to direct the flow of pressurized gas through the valve block 102. In addition to the four valves shown, at least one additional valve or an electric motor is required to control the position of the stretch rod 104.

Typically, the blow molding process begins with a pre-blowing phase. During this phase, a pressure up to approximately 12 bar (174 psi) is provided to the preform while the stretch rod 104 simultaneously extends the preform in a longitudinal direction. During this pre-blowing phase, there is an attempt to substantially uniformly distribute the material of the preform along the longitudinal length prior to expansion of the preform against the mold cavity.

Once the pre-blowing phase is complete, the pre-blowing valve is closed and the blowing valve is opened, the blowing pressure is provided to the stretched preform. Upon completion of the blowing phase, the blowing valve is closed and the air-recovery valve can be opened. During the air-recovery phase, a portion of the blowing pressure can be recovered for later use. For example, the blowing pressure may be reused for the next pre-blowing phase. Finally, the exhaust valve is opened to exhaust the remaining pressure from the formed product.

Due to the cost associated with the air required for the pre-blowing and blowing phases, there have been numerous attempts to reduce the amount of air used and reduce the energy required to deliver the air to the preform. One prior art attempt is to use a single proportional valve for providing the air to the preform. Such an approach is outlined in WO/2011/154326, which is assigned on its face to the present applicants. Proportional valves are generally known in the art and can operate to open a port of the valve at virtually any point between fully open and fully closed. Therefore, rather than a simple on/off operation as in traditional valves, proportional valves are capable of maintaining an actuation state between fully on and fully off. Although the approach proposed by the '326 application provides adequate proportional control in some situations, the use of a single proportional valve for the pre-blowing and the blowing pressure has serious drawbacks. For example, the proportional valve is often controlled with a proportional solenoid, which can increase the energy and cost associated with operation of the valve. Furthermore, the system proposed by the '326 application utilizes a single pressure supply, which needs to be at the higher blowing pressure, i.e., 40 bar (580 psi). With a single pressure supply, it is difficult, if not impossible, to recover any of the air at the end of a molding cycle. Consequently, the system fails to recycle any of the air resulting in excessive consumption of air.

The embodiments described below overcome these and other problems and an advance in the art is achieved. The embodiments described below provide a stretch blow molding system with a single blow mold valve in fluid communication with a low-pressure source and a high-pressure source. The low-pressure source is utilized during the pre-blowing phase while the high-pressure source can be utilized during the blowing phase.

SUMMARY OF THE INVENTION

A stretch blow molding system is provided according to an embodiment. The stretch blow molding system comprises a cylinder including a movable stretch rod and a blow-mold valve. According to an embodiment, the blow-mold valve includes a first fluid port in fluid communication with a first pressurized fluid source and a second fluid port in fluid communication with a second pressurized fluid source. According to an embodiment, the blow-mold valve further comprises a third fluid port in fluid communication with the cylinder and selectively in fluid communication with the first fluid port and the second fluid port.

A method for stretch blow molding a preform in a mold cavity is provided according to an embodiment. The mold cavity is coupled to a stretch blow molding system, which includes a cylinder and a stretch rod movable within the cylinder. According to an embodiment, the method comprises a step of actuating a blow-mold valve from a first position to a second position, wherein a first fluid port of the blow-mold valve is in fluid communication with a first pressurized fluid source and a third fluid port is in fluid communication with the preform. According to an embodiment, the method further comprises a step of pressurizing the preform to a first pressure using pressurized gas supplied from the first pressurized fluid source through the blow-mold valve. According to an embodiment, the method further comprises steps of moving the stretch rod out of the cylinder to stretch the preform in a longitudinal direction and actuating the blow-mold valve from the second position to a third position, wherein a second fluid port of the blow-mold valve is in fluid communication with a second pressurized fluid source. According to an embodiment, the method further comprises a step of pressurizing the preform to a second pressure using the pressurized gas supplied from the second pressurized fluid source through the blow-mold valve.

Aspects

According to an aspect, a stretch blow molding system comprises:
  a cylinder including a movable stretch rod;
  a blow-mold valve including:
    a first fluid port in fluid communication with a first pressurized fluid source;
    a second fluid port in fluid communication with a second pressurized fluid source; and
    a third fluid port in fluid communication with the cylinder and selectively in fluid communication with the first fluid port and the second fluid port.

Preferably, the first pressurized fluid source is at a first pressure and the second pressurized fluid source is at a second pressure higher than the first pressure.

Preferably, the stretch blow molding system further comprises a fourth fluid port in fluid communication with an exhaust and selectively in fluid communication with the third fluid port.

Preferably, the blow-mold valve comprises a spool valve.

Preferably, a spool of the blow-mold valve comprises first and second opposing walls to substantially cancel biasing forces applied to the spool from the first or second pressurized fluid sources.

Preferably, the blow-mold valve comprises a glandless spool valve.

Preferably, the stretch blow molding system further comprises a check valve positioned between the first pressurized fluid source and the first fluid port.

Preferably, the stretch blow molding system further comprises a mold cavity coupled to the cylinder and in fluid communication with the third fluid port.

According to another aspect, a method for stretch blow molding a preform in a mold cavity coupled to a stretch blow molding system including a cylinder and a stretch rod movable within the cylinder comprises steps of:
  actuating a blow-mold valve from a first position to a second position, wherein a first fluid port of the blow-mold valve is in fluid communication with a first pressurized fluid source and a third fluid port is in fluid communication with the preform;
  pressurizing the preform to a first pressure using pressurized gas supplied from the first pressurized fluid source through the blow-mold valve;
  moving the stretch rod out of the cylinder to stretch the preform in a longitudinal direction;
  actuating the blow-mold valve from the second position to a third position, wherein a second fluid port of the blow-mold valve is in fluid communication with a second pressurized fluid source; and
  pressurizing the preform to a second pressure using the pressurized gas supplied from the second pressurized fluid source through the blow-mold valve.

Preferably, the first pressurized fluid source is at a first pressure and the second pressurized fluid source is at a second pressure higher than the first pressure.

Preferably, the method further comprises a step of actuating the blow-mold valve back to the first position to selectively bring a fourth fluid port in fluid communication with the third fluid port, wherein the fourth fluid port is in fluid communication with an exhaust.

Preferably, the blow-mold valve comprises a spool valve.

Preferably, the method further comprises steps of biasing a spool of the blow-mold valve in a first direction with the first and second pressurized fluid sources acting on a first wall of the spool and biasing the spool in a second opposite direction with the first and second pressurized fluid sources acting on a second wall of the spool that opposes the first wall.

Preferably, the blow-mold valve comprises a glandless spool valve.

Preferably, the method further comprises a step of positioning a check valve between the first pressurized fluid source and the first fluid port.

DETAILED DESCRIPTION OF THE INVENTION

FIGS. 2-6 and the following description depict specific examples to teach those skilled in the art how to make and use the best mode of embodiments of a blow molding system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the blow molding system. As a result, the embodiments described below are not limited to the specific examples described below, but only by the claims and their equivalents.

Figure 2:
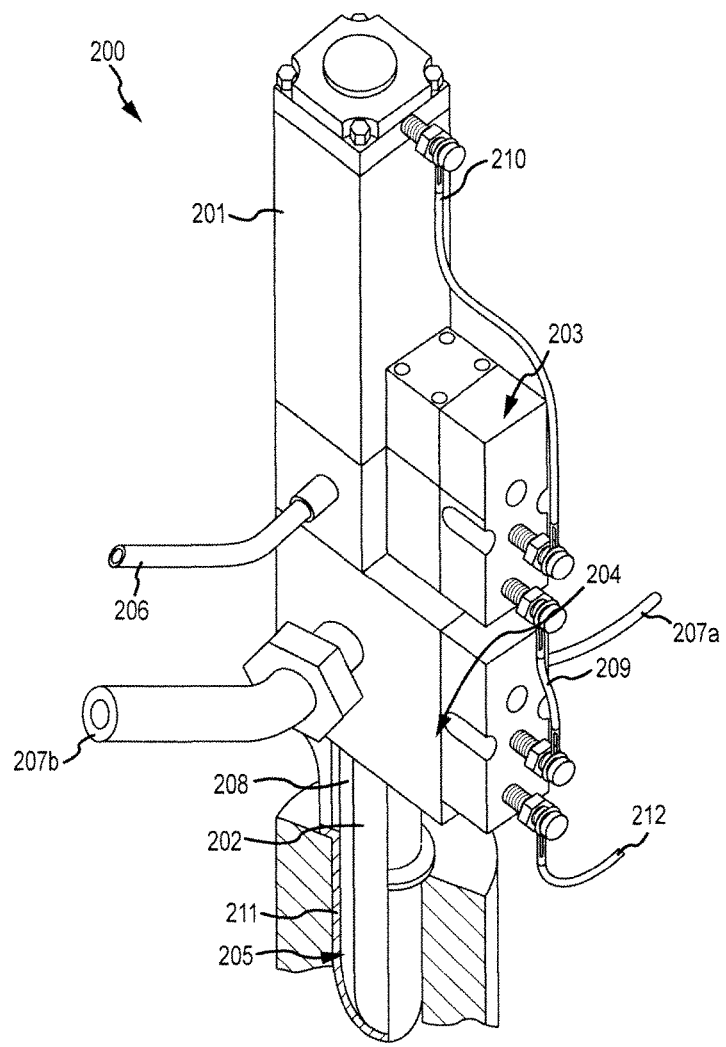
FIG. 2 shows a stretch blow molding system according to an embodiment.

FIG. 2 shows a stretch blow molding system 200 according to an embodiment. The stretch blow molding system 200 can include a cylinder 201, a stretch rod 202, a stretch rod control valve 203, and a blow-mold valve 204. While the stretch rod control valve 203 and the blow-mold valve 204 are shown as being coupled to the cylinder 201, in other embodiments, the valves 203, 204 may be separated from the cylinder 201. According to an embodiment, the cylinder 201 is adapted to form a substantially fluid-tight seal with a mold cavity 205. According to another embodiment, the cylinder 201 is adapted to form a substantially fluid-tight seal with the preform 211, which is positioned partially in the mold cavity 205 and in fluid communication with the blow-mold valve 204 in FIG. 2. A portion of the preform 211 is shown outside of the mold cavity 205 and coupled to the cylinder 201. In other embodiments, the cylinder 201 may couple to the mold cavity 205 and the entire preform 211 may be positioned within the mold cavity 205. It should be appreciated that the mold cavity 205 may be provided as a separate component provided by an end user, for example and may not form part of the stretch blow molding system 200. Therefore, the stretch blow molding system 200 may be adapted to couple numerous different types of mold cavities 205 and preforms 211.

According to an embodiment, the stretch rod control valve 203 comprises a proportional valve. Proportional valves are generally known in the art and can operate to open a port of the valve at virtually any point between fully open and fully closed. Therefore, rather than simple on/off operation as in traditional valves, proportional valves are capable of maintaining an actuation state between fully on and fully off. It should be appreciated however, that in other embodiments, the stretch rod position may be controlled with a traditional on/off valve or by an electronic motor, for example. Therefore, the particular method used to control the position of the stretch rod 202 should in no way limit the scope of the present embodiment.

According to an embodiment, the stretch rod control valve 203 is adapted to control movement of the stretch rod 202 using pressurized fluid provided from a pressurized fluid source 363 (See FIGS. 3-5) via a fluid supply conduit 206. The pressurized fluid may comprise a liquid or a gas. For example, the stretch rod control valve 203 may be suitable for use as a pneumatic or a hydraulic valve. While the pressurized fluid provided to the stretch rod control valve 203 may be at any suitable pressure, according to an embodiment, the pressurized fluid source 363 is at a pressure between approximately 10 bar and approximately 16 bar (145 and 232 psi). However, because the stretch rod control valve 203 can comprise a proportional valve in some embodiments, the pressure of the fluid delivered to the cylinder 201 may be at a pressure less than the pressurized fluid source 363. In other embodiments, the stretch rod control valve 203 may not comprise a proportional valve, but rather may comprise a traditional valve, in which case, the pressure supplied to the cylinder 201 will comprise approximately the same pressure supplied to the stretch rod control valve 203.

According to an embodiment, the blow-mold valve 204 is adapted to control a pressurized gas supply to/from the mold cavity 205. While the pressurized gas is typically air, other gases may be desired depending on the particular application. In the embodiment shown in FIG. 2, pressurized gas can be received by the blow-mold valve 204 from a first pressurized fluid source 364a (See FIGS. 3-5) via a pressurized fluid supply conduit 207a as well as a second pressurized fluid source 364b via a pressurized fluid supply conduit 207b. According to an embodiment, the first pressurized fluid source 364a may comprise a first pressure that is approximately 1-12 bar (14.5-174 psi). According to an embodiment, the second pressurized fluid source 364b may be at a second pressure at approximately 40 bar (580 psi), for example. Therefore, the first pressurized fluid source 364a can comprise the low-pressure supply while the second pressurized fluid source 364b can comprise the high-pressure supply. However, other pressures are certainly contemplated by the present embodiment. According to an embodiment, the first and second pressurized fluid sources can comprise a gas. The gas may comprise air or some other suitable gas as those skilled in the art will generally understand.

Based on the blow-mold valve's position, the pressurized gas can be provided to the mold cavity 205 through an opening 208 defined between the preform 211 and the stretch rod 202. The conduits or other fluid communication paths between the valves 203, 204 and the cylinder 201 are not shown in FIG. 2 in order to minimize the complexity of the drawing; however, they are shown schematically in FIGS. 3-5. As can be appreciated, because a single blow-mold valve 204 is in fluid communication with both the low-pressure supply and the high-pressure supply, the time required between the pre-blowing phase and the blowing phase can be shortened while eliminating the drawbacks mentioned above with using a single pressure source.

According to an embodiment, the stretch rod control valve 203 and the blow-mold valve 204 may be in electrical communication with one another. In the embodiment shown, the two valves 203, 204 are in electrical communication via the cable 209; however, the two valves 203, 204 could communicate via a wireless communication interface. Further shown in FIG. 2 is a cable 210, which provides an electrical communication interface between the stretch rod control valve 203 and a position sensor 330a-b (See FIGS. 3-5) provided in the cylinder 201. The position sensor 330a-b may provide a signal to the stretch rod control valve 203 indicating a position of the stretch rod 202 relative to the cylinder 201, for example. Additionally shown in FIG. 2 is a portion of a cable 212. The cable 212 can provide an electrical communication interface between the valve 204 and a valve controller, such as an external processing system (not shown). According to an embodiment, the cable 212 may also provide power to the valves 203, 204 if the valves are electrically actuated, such as solenoid-controlled valves. The processing system may comprise a microprocessor, a CPU, or some other processing device. The processing system may be distributed among multiple devices. The processing system may include an internal and/or external storage system. The processing system may include various valve set points and stretch rod position set points to accommodate various blow-molding applications. The processing system may include a user interface such as a monitor, keyboard, and mouse, etc., as is well known in the art. The processing system may allow a user or operator to control the valves 203, 204. Alternatively, each of the valves 203, 204 may include a programmable logic controller (PLC) (not shown) and the cable 212 can be provided to supply power to the valves 203, 204. The PLC may be provided to control the valve's solenoid and/or provide feedback to the valve's controller. In some embodiments, the use of a PLC may reduce the response time of the valves 203, 204 thereby providing increased accuracy. The PLC may provide an output signal to a user or operator via the cable 212.

Figure 3:
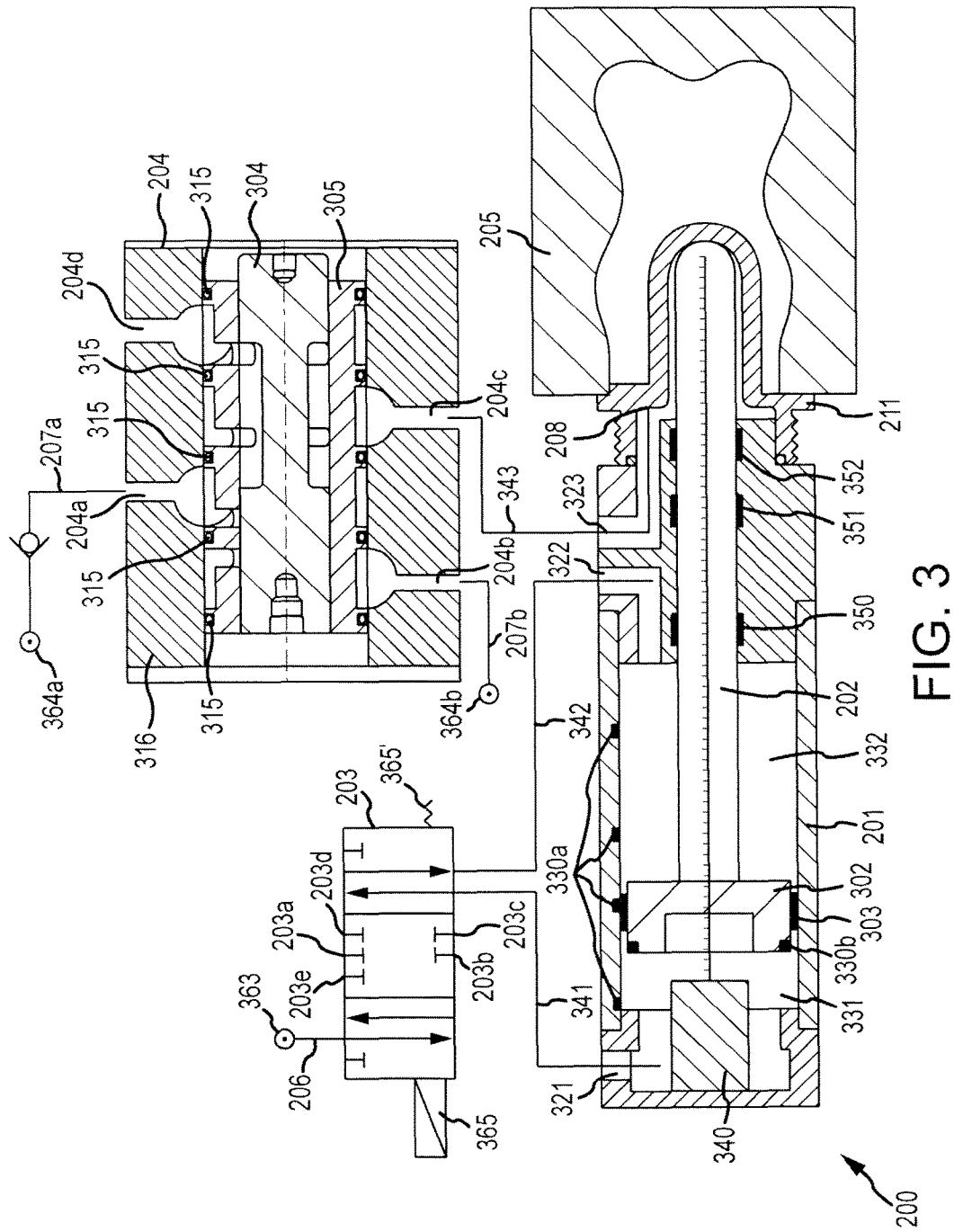
FIG. 3 shows a cross-sectional view of the stretch blow molding system according to an embodiment.

FIG. 3 shows a cross-sectional view of the stretch blow-molding system 200 according to an embodiment. In FIG. 3, the valve 203 is shown schematically, while the valve 204 is shown as a partial cross-sectional view. Further, it should be appreciated that the electrical cables 209, 210, 212 are not shown in FIG. 3 in order to simplify the complexity of the drawing.

According to the embodiment provided in FIG. 3, the stretch rod control valve 203 is in fluid communication with a first port 321 and a second port 322 formed in the cylinder 201. According to an embodiment, a piston 302 separates the cylinder 201 into a first chamber 331 and a second chamber 332. According to an embodiment, the piston 302 is coupled to the stretch rod 202. The piston 302 and stretch rod 202 may be movable within the cylinder 201. The piston 302 may include a sealing member 303, which can provide a substantially fluid-tight seal between the piston 302 and the cylinder 201. Further, the cylinder 201 can include additional sealing members 350, 351, 352, which form a substantially fluid-tight seal with the stretch rod 202. The sealing members 303 and 350-352 can prevent pressurized fluid from passing between chambers 331, 332 or from the second chamber 332 to the mold cavity 205. According to an embodiment, the first port 321 is in fluid communication with the first chamber 331 and the second port 322 is in fluid communication with the second chamber 332. According to an embodiment, when pressurized fluid is provided to the first port 321, the first chamber 331 is pressurized thereby actuating the piston 302 and thus, the stretch rod 202 in a first direction. Conversely, when pressurized fluid is provided to the second port 322, the second chamber 332 is pressurized, which actuates the piston 302 and thus, the stretch rod 202 in a second direction, substantially opposite the first direction.

Also provided in FIG. 3, is the position sensor 330, which comprises a first sensor portion 330a coupled to the cylinder housing 201 and a second sensor portion 330b coupled to the piston 302. Although not shown in FIG. 3, the first sensor portion 330a may be in communication with the stretch rod control valve 203 via the cable 210. According to one embodiment, the first portion of the position sensor 330 may comprise one or more magnetic sensors 330a while the second portion comprises a magnet 330b. One example of a position sensor that may be used with the present embodiment is disclosed in U.S. Pat. No. 7,263,781, which is assigned to the applicants of the present application. However, it should be appreciated that other position sensors may certainly be utilized without departing from the scope of the present embodiment.

As discussed briefly above, according to an embodiment, the stretch rod control valve 203 comprises a proportional valve. However, the stretch rod control valve 203 does not have to comprise a proportional valve and other types of valves may be used. In the embodiment provided in FIG. 3, the stretch rod control valve 203 comprises a 5/3 proportional valve. The stretch rod control valve 203 may comprise a 5/3 proportional spool valve, for example. According to an embodiment, the stretch rod control valve 203 comprises a solenoid-actuated proportional spool valve. A spring 365' or other biasing member may be provided to de-actuate the valve 203 or bring the valve 203 to a default position. In other embodiments, a second solenoid (not shown) may be provided. According to an embodiment, in a de-actuated position, the stretch rod control valve 203 is closed. According to an embodiment, in the de-actuated position, pressurized fluid is not provided to or exhausted from the first or second chambers 331, 332.

According to an embodiment, a solenoid 365 may be used to open the stretch rod control valve 203 towards one or more actuated positions. Further, in embodiments where the stretch rod control valve 203 comprises a proportional valve, the solenoid 365 may be used to actuate the valve 203 to positions between a de-actuated position and a fully actuated position based on the set point signal provided to the solenoid 365. As mentioned briefly above, the set point signal may be provided by the processing system according to the desired operating parameters. According to an embodiment, when the solenoid 365 actuates the stretch rod control valve 203 to a first actuated position, pressurized fluid is provided from a first port 203a to a second port 203b. In the embodiment shown, the first port 203a is adapted to receive a pressurized fluid. For example, the first port 203a is shown in fluid communication with the pressurized fluid source 363 while the second port 203b is in fluid communication with the first port 321 formed in the cylinder 201 via fluid pathway 341. The first port 203a is selectively in fluid communication with the second port 203b when the stretch rod control valve 203 is opened towards the first actuated position. Further, pressurized fluid can be exhausted from the third port 203c to the fourth port 203d. Therefore, as the stretch rod control valve 203 is actuated towards the first actuated position, pressurized fluid is supplied from the pressurized fluid source 363 to the first chamber 331 and exhausted from the second chamber 332. It should be appreciated that when the stretch rod control valve is partially opened and between the de-actuated position and the first actuated position, the fluid communication path between the first port 203a and the second port 203b is only partially opened. Thus, less than the full pressure provided to the first port 203a of the stretch rod control valve 203 from the pressurized fluid source 363 is delivered to the second port 203b of the stretch rod control valve 203. Additionally, prior to fully reaching the first actuated position, the fluid communication path between the third port 203c and the fourth port 203d is not fully opened and therefore, the fluid exhausted from the second chamber 332 is limited. Advantageously, if only a small movement of the stretch rod 202 is desired, the stretch rod control valve 203 can be actuated to a position between the de-actuated position and the first actuated position and only partially opened.

According to an embodiment, when the stretch rod control valve 203 is actuated and opened towards a second actuated position, the first port 203a is brought into fluid communication with the third port 203c and the second port 203b is brought into fluid communication with the fifth port 203e, which comprises an exhaust. Therefore, when the stretch rod control valve is opened towards the second actuated position, the stretch rod control valve 203 provides pressurized fluid to the second chamber 332 and exhausts the first chamber 331 to move the piston 302 and thus, the stretch rod 202 in a second longitudinal direction. It should be appreciated that less than the full pressure provided to the first port 203a is delivered to the third port 203c prior to the stretch rod control valve 203 fully reaching the second actuated position.

It should be appreciated that while the position of the stretch rod 202 is described as being controlled with the stretch rod control valve 203, in other embodiments, the stretch rod 202 can be controlled by other components, such as an electric linear motor, a solenoid, etc. Therefore, the present embodiment should not be limited to requiring the stretch rod control valve 203.

Figure 1:
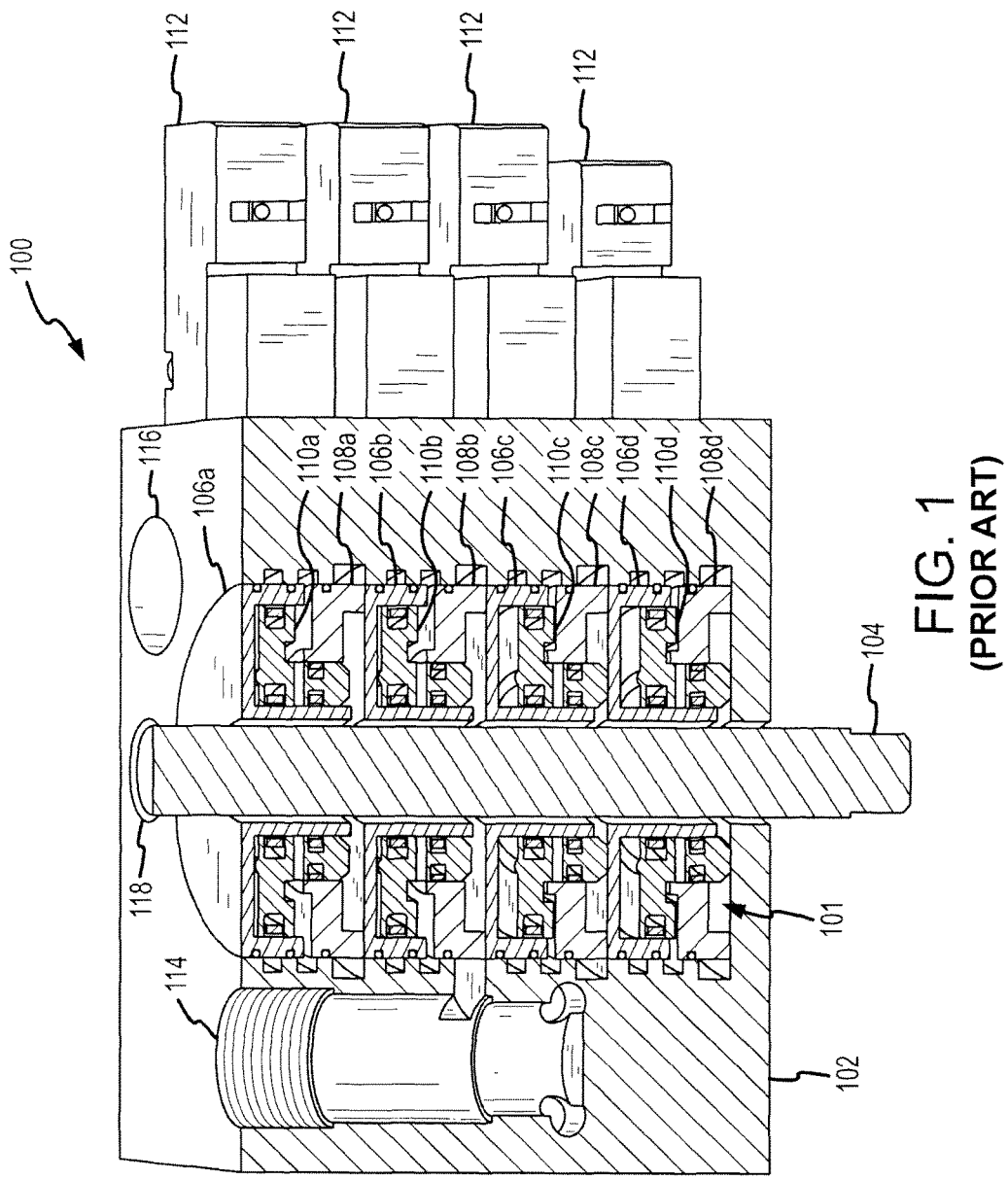
FIG. 1 shows a prior art blow molding valve block assembly.

Also shown in FIG. 3 is the blow-mold valve 204. As discussed above, the blow-mold valve 204 may be in fluid communication with the first pressurized fluid source 364a as well as the second pressurized fluid source 364b. This is in contrast to many prior art systems, including the prior art system shown in FIG. 1, which provides separate low-pressure and high-pressure valves. Furthermore, the present embodiment is different from the '326 application referenced above, which provides a single blow-mold valve, but also provides only a single pressure source.

According to an embodiment, the blow-mold valve 204 comprises a spool valve. According to an embodiment, the blow-mold valve 204 comprises a glandless spool valve. Glandless spool valves are generally known in the art and do not require separate seals between the spool 304 and the sleeve 305. Consequently, less friction is experienced during actuation compared to valves with separate seals. For example, the Iso*star glandless spool valves currently sold by the present applicants comprise a Teflon coated spool that slides within an aluminum sleeve. The Teflon spool provides the necessary sealing function without the need for separate seals. However, one or more seals 315 can be provided between the sleeve 305 and the housing 316. It should be appreciated that other valves may be used and the present embodiment should in no way be limited to the particular examples provided. The use of a glandless spool valve can reduce friction, and thus, the wear experienced by the valve. Therefore, the life of the blow-mold valve 204 can be increased. Further, because the friction between the spool 304 and the sleeve 305 is reduced, less energy is required to actuate the valve. It should be appreciated, however, that in other embodiments, the blow-mold valve 204 may include seals between the spool 304 and the sleeve 305 (See FIG. 6).

According to an embodiment, the blow-mold valve 204 comprises a 4/3-way valve. However, other configurations are possible and the presently shown embodiment should in no way limit the scope of the claims that follow.

In the embodiment shown in FIG. 3, the blow-mold valve 204 is in a first (de-actuated) position. In the first position, the first fluid port 204a and the second fluid port 204b are closed off while the third fluid port 204c is in fluid communication with the fourth fluid port 204d. According to an embodiment, the first fluid port 204a is in fluid communication with the first pressurized fluid source 364a and the second fluid port 204b is in fluid communication with the second pressurized fluid source 364b. According to an embodiment, the third fluid port 204c is in fluid communication with the mold cavity 205 via the opening 208 while the fourth fluid port 204d is in fluid communication with an exhaust. Therefore, when the blow-mold valve 204 is in the first position, the cavity 205 is opened to exhaust and is closed off from both the first pressurized fluid source 364a and the second pressurized fluid source 364b. It should be appreciated that in some embodiments, the fourth fluid port 204d may be further in fluid communication with a recycling valve (not shown) or the like such that a portion of the air exhausted from the cavity 205 can be recycled and used during the subsequent pre-blowing phase. For example, some of the exhausted air may be returned to the first pressurized fluid source 364a. Such recycling configurations are generally known in the art and thus, have been omitted to simplify the drawing.

Figure 4:
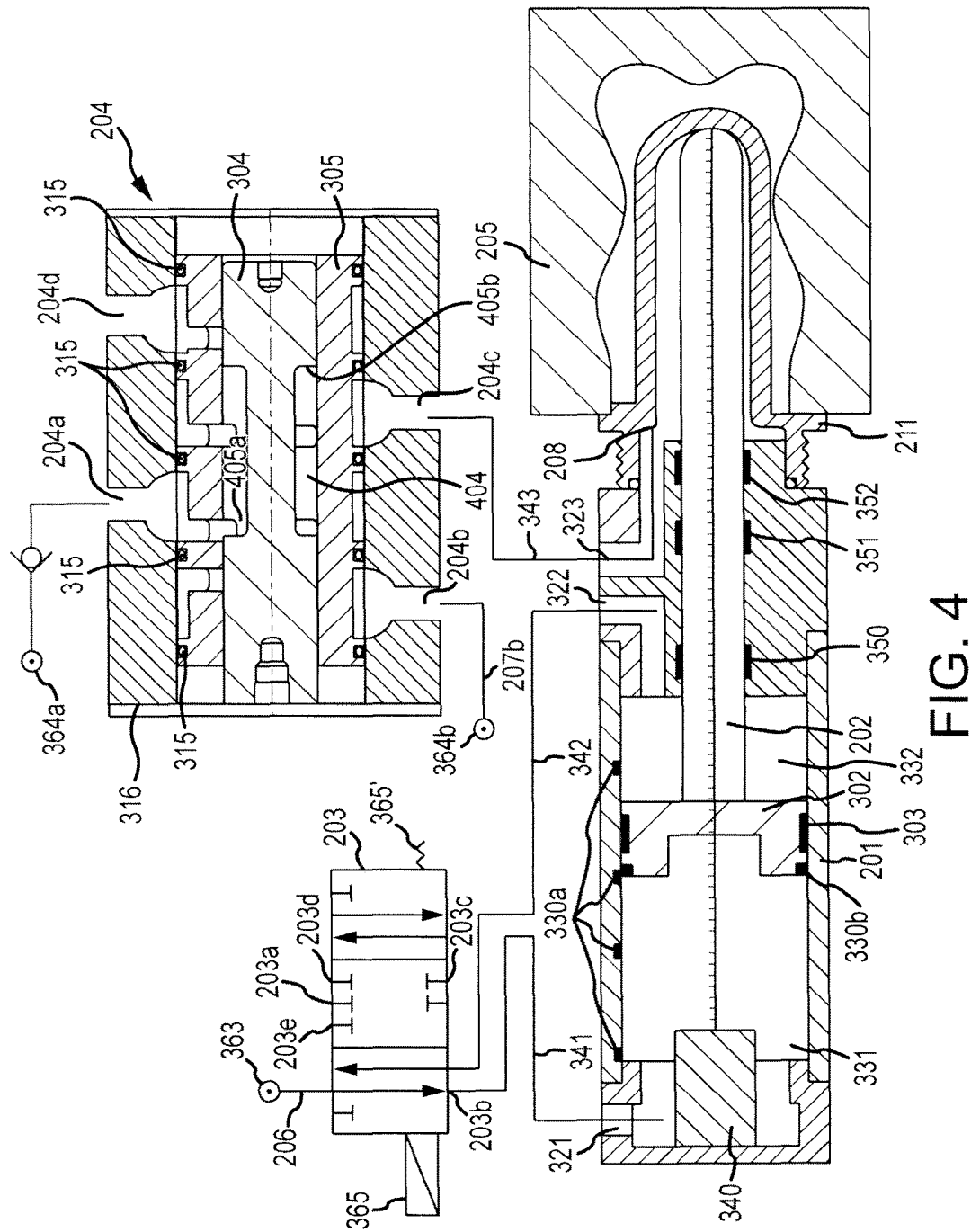
FIG. 4 shows a cross-sectional view of the stretch blow molding system according to another embodiment.

In order to begin the pre-blowing phase, cylinder 201 can form a substantially fluid-tight seal with the mold cavity 205 or the preform 211 and the stretch rod control valve 203 can be actuated to the first actuated position and the blow-mold valve 204 can be actuated to a second position as shown in FIG. 4.

FIG. 4 shows a cross-sectional view of the stretch blow molding system 200 according to another embodiment. As mentioned above, FIG. 4 shows the pre-blowing phase. According to an embodiment, during the pre-blowing phase, the stretch rod control valve 203 can be actuated to the first actuated position and consequently, the stretch rod 202 can extend into the mold cavity 205 as discussed above. With the stretch rod 202 extending into the mold cavity 205, the preform 211 is also stretched in a longitudinal direction.

According to an embodiment, in addition to the stretch rod control valve 203 being actuated, the blow-mold valve 204 is also actuated from the first position to a second position. According to an embodiment, in the second position, the fourth fluid port 204d is closed off while the first fluid port 204a is selectively brought into fluid communication with the third fluid port 204c. The low-pressure fluid travels through the valve 204 into a middle chamber 404 defined by the valve spool 304 and the sleeve 305. As can be seen, the spool 304 includes first and second end walls 405a, 405b, which partially define the middle chamber 404. The end walls 405a, 405b can be approximately the same size such that the pressure from the first pressurized fluid source 364a acts substantially equally upon the walls 405a, 405b. This substantially equal force cancels out resulting in no, or very little, net force acting on the spool 304 from the first pressurized fluid source 364a. Consequently, a much lower force is required to actuate the spool 304 than if the first pressurized fluid source 364a biased the spool 304 in one direction more than another. The lower actuation force can be performed via a pilot pressure, a solenoid, mechanical means, etc. The particular method used for actuating the blow-mold valve 204 is not important for the purposes of the present embodiment and should in no way limit the scope of the present embodiment.

According to an embodiment, with the stretch rod 202 extending partially into the mold cavity 205 and the first pressurized fluid source 364a being in fluid communication with the preform 211, the preform 211 is extended in the longitudinal direction and expanded radially outward by the pressure. According to an embodiment, once the stretch rod 202 reaches a desired position as determined by the position sensor 330, the stretch rod control valve 203 can be de-actuated or alternatively, the stretch rod control valve 203 can be actuated to the second actuated position to equalize the pressures in the first and second chambers 331, 332 to stop the stretch rod 202 from moving further. Alternatively, the stretch rod control valve 203 can be de-actuated or actuated to the second actuated position based on a predetermined time rather than being based on the position of the stretch rod 202.

According to an embodiment, at the end of the pre-blowing phase, the blow-mold valve 204 can be actuated to a third position to initiate the blowing phase. According to an embodiment, the end of the pre-blowing phase may occur after a predetermined amount of time. According to another embodiment, the end of the pre-blowing phase may occur once the stretch rod 202 reaches a threshold position as determined by the position sensor 330.

Figure 5:
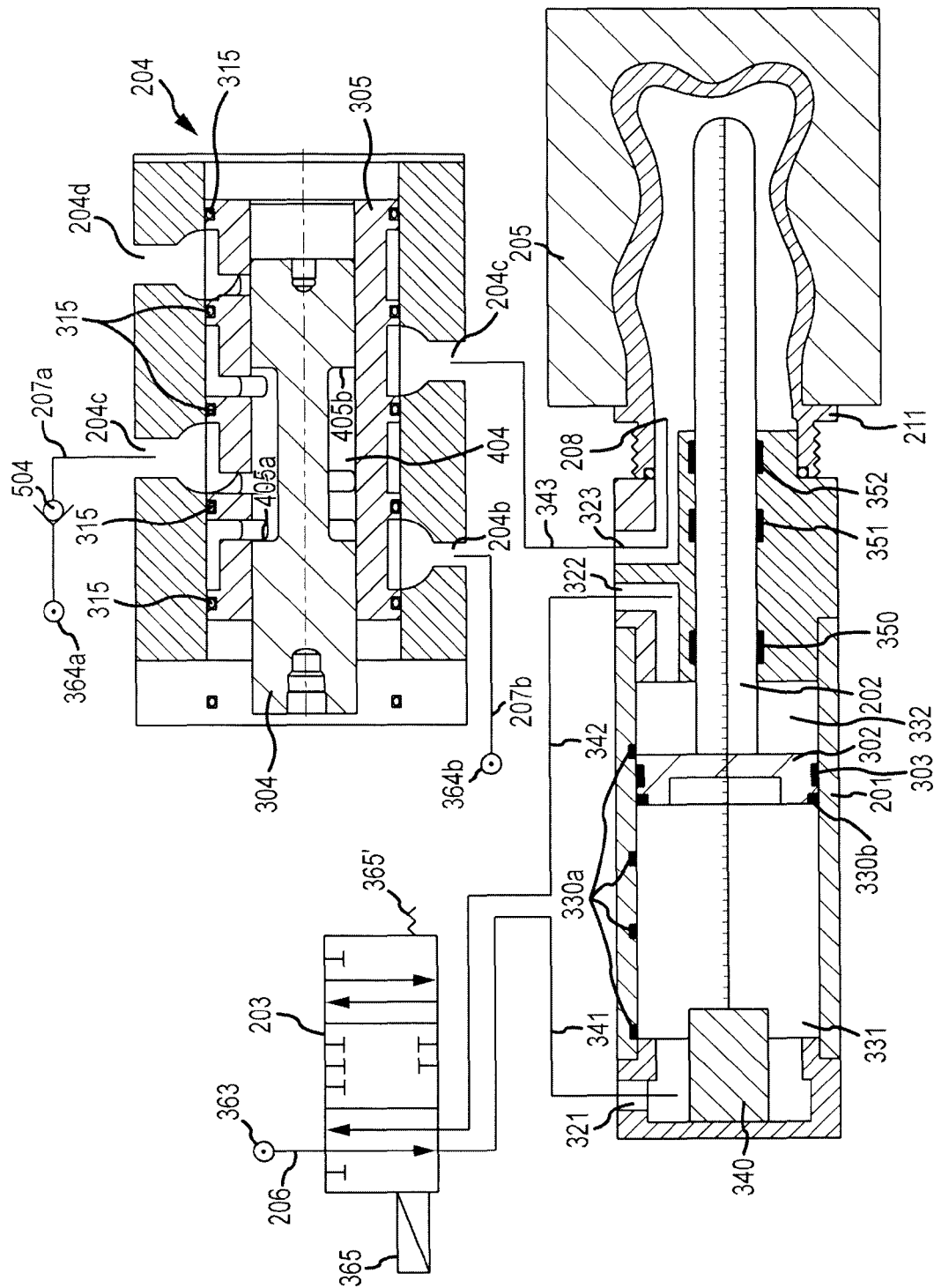
FIG. 5 shows a cross-sectional view of the stretch blow molding system according to another embodiment.

FIG. 5 shows a cross-sectional view of the stretch blow molding system 200 during the blowing phase according to an embodiment. According to an embodiment, during the blowing phase, the blow-mold valve 204 can be actuated to a third position. In the third position, the spool 304 moves further to bring the second pressurized fluid source 364b in fluid communication with the cavity 205 via the second fluid port 204b and the third fluid port 204c. According to an embodiment, the first fluid port 204a is still exposed to the second and third fluid ports 204b, 204c. Consequently, in some embodiments, a check valve 504 may be provided to prevent the higher pressure of the second pressurized fluid source 364b from affecting the first pressurized fluid source 364a.

As can be appreciated, although the second pressurized fluid source 364b may be at approximately 40 bar (580 psi), the force required to actuate the blow-mold valve 204 has remained substantially constant as the high-pressure is applied to both of the opposing walls 405a, 405b substantially equally. Therefore, unlike some prior art valves that require an increased actuation force when the pressure flowing through the valve increases, the actuation force of the presently described blow-mold valve 204 can remain substantially the same regardless of the operating pressure flowing through the valve.

With the second pressurized fluid source 364b being in fluid communication with the mold cavity 205, the preform 211 has been expanded further to assume the shape of the mold cavity 205 and thereby provide the final shape of the stretch blow molded container.

According to an embodiment, at the end of the blowing phase, the blown container can be exhausted by actuating the blow-mold valve 204 back to the first position to exhaust the pressure in the container. As discussed above, in some embodiments, a portion of the exhausted gas can be reused for the first pressurized fluid source and used during the subsequent pre-blowing phase. Additionally, the stretch blow molding valve 203 can be actuated to the second actuated position to withdraw the stretch rod 202 back into the cylinder 201.

Figure 6:
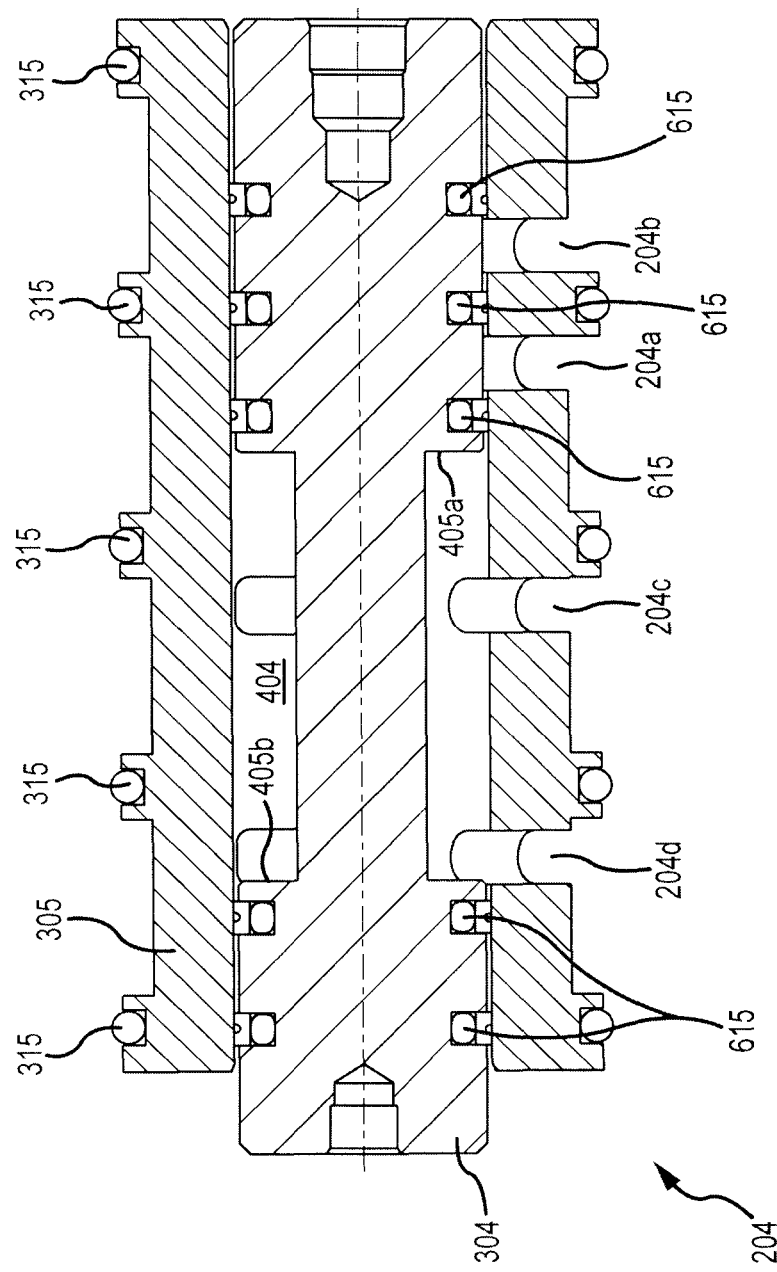
FIG. 6 shows a cross-sectional view of a blow mold valve according to an embodiment.

FIG. 6 shows a cross-sectional view of the blow-mold valve 204 according to another embodiment. In the embodiment shown, the housing 316 is omitted and only the spool 304 and the sleeve 305 are shown. The blow-mold valve 204 shown in FIG. 6 is similar to the blow-mold valve shown in the previous figures. However, the blow-mold valve 204 shown in FIG. 6 includes a plurality of sealing members 615 that form substantially fluid-tight seals between the spool 304 and the sleeve 305. Therefore, the blow-mold valve 204 does not have to comprise a glandless spool valve as shown in the previous embodiments.

The embodiments described above provide a stretch blow molding system 200 with reduced energy requirements. The required energy can be reduced by using a single blow-mold valve that is in fluid communication with first and second pressurized fluid sources that are at two different pressures. Namely, a first pressure source can comprise a low pressure at approximately 12 bar (174 psi) and a second pressure source can comprise the high pressure at approximately 40 bar (580 psi). Providing two pressure sources that are controlled with a single valve can increase the speed at which the molding cycle can change from the pre-blowing phase to the blowing phase and also allow some of the air to be recycled for subsequent pre-blowing phases. Additionally, because the pressure acts on two opposing walls 405a, 405b of the spool 304, the energy required to actuate the valve can be reduced. The actuation energy can be further reduced in embodiments that utilize a glandless spool valve as the friction between the spool 304 and the sleeve 305 can be reduced compared to embodiments that use separate sealing members 615.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other blow molding systems, and not just to the embodiments described above and shown in the accompanying figures. Accordingly, the scope of the embodiments described above should be determined from the following claims.

I claim:

1. A stretch blow molding system (200), comprising:
   a cylinder (201) including a movable stretch rod (202);
   a blow-mold valve (204) comprising a spool valve including:
      a first fluid port (204a) in fluid communication with a first pressurized fluid source (364a);
      a second fluid port (204b) in fluid communication with a second pressurized fluid source (364b); and
      a third fluid port (204c) in fluid communication with the cylinder (201) and selectively in fluid communication with the first fluid port (204a) and the second fluid port (204b).

2. The stretch blow molding system (200) of claim 1, wherein the first pressurized fluid source (364a) is at a first pressure and the second pressurized fluid source (364b) is at a second pressure higher than the first pressure.

3. The stretch blow molding system (200) of claim 1, further comprising a fourth fluid port (204d) in fluid communication with an exhaust and selectively in fluid communication with the third fluid port (204c).

4. The stretch blow molding system (200) of claim 1, wherein a spool (304) of the blow-mold valve (204) comprises first and second opposing walls (405a, 405b) to substantially cancel biasing forces applied to the spool (304) from the first or second pressurized fluid sources (364a, 364b).

5. The stretch blow molding system (200) of claim 1, wherein the blow-mold valve (204) comprises a glandless spool valve.

6. The stretch blow molding system (200) of claim 1, further comprising a check valve (504) positioned between the first pressurized fluid source (364a) and the first fluid port (204a).

7. The stretch blow molding system (200) of claim 1, further comprising a mold cavity (205) coupled to the cylinder (201) and in fluid communication with the third fluid port (204c).

8. A method for stretch blow molding a preform in a mold cavity coupled to a stretch blow molding system including a cylinder and a stretch rod movable within the cylinder, comprising steps of:
   actuating a blow-mold valve from a first position to a second position, wherein a first fluid port of the blow-mold valve is in fluid communication with a first pressurized fluid source and a third fluid port is in fluid communication with the preform, wherein the blow-mold valve comprises a spool valve;
   pressurizing the preform to a first pressure using pressurized gas supplied from the first pressurized fluid source through the blow-mold valve;
   moving the stretch rod out of the cylinder to stretch the preform in a longitudinal direction;

actuating the blow-mold valve from the second position to a third position, wherein a second fluid port of the blow-mold valve is in fluid communication with a second pressurized fluid source; and pressurizing the preform to a second pressure using the pressurized gas supplied from the second pressurized fluid source through the blow-mold valve.

9. The method of claim 8, wherein the first pressurized fluid source is at a first pressure and the second pressurized fluid source is at a second pressure higher than the first pressure.

10. The method of claim 8, further comprising a step of actuating the blow-mold valve back to the first position to selectively bring a fourth fluid port in fluid communication with the third fluid port, wherein the fourth fluid port is in fluid communication with an exhaust.

11. The method of claim 8, further comprising steps of biasing a spool of the blow-mold valve in a first direction with the first and second pressurized fluid sources acting on a first wall of the spool and biasing the spool in a second opposite direction with the first and second pressurized fluid sources acting on a second wall of the spool that opposes the first wall.

12. The method of claim 8, wherein the blow-mold valve comprises a glandless spool valve.

13. The method of claim 8, further comprising a step of positioning a check valve between the first pressurized fluid source and the first fluid port.

* * * * *